United States Patent [19]

Cholet

[11] 4,421,049

[45] Dec. 20, 1983

[54] SUBMERGED DEVICE, CARRYING OCEANOGRAPHY APPARATUSES, WITH AUTOMATIC DEPTH CONTROL

[75] Inventor: Jacques Cholet, L'Etang la Ville, France

[73] Assignee: Institut Francais du Petrole, Rueil-Malmaison, France

[21] Appl. No.: 200,867

[22] Filed: Oct. 27, 1980

Related U.S. Application Data

[63] Continuation of Ser. No. 925,243, Jul. 17, 1978, abandoned.

[30] Foreign Application Priority Data

Jul. 18, 1977 [FR] France ............................ 77 22182

[51] Int. Cl.³ .......................................... B63B 21/56
[52] U.S. Cl. .................................................. 114/245
[58] Field of Search ............... 114/244, 245, 331, 332; 367/102, 106; 242/107.5

[56] References Cited

U.S. PATENT DOCUMENTS

| | | | |
|---|---|---|---|
| 3,002,483 | 10/1961 | Steinberg | 114/331 |
| 3,012,736 | 12/1961 | Brust | 242/107.5 |
| 3,331,050 | 7/1967 | Kilmer et al. | 367/106 |
| 3,375,800 | 4/1968 | Cole et al. | 114/245 |
| 3,440,992 | 4/1969 | Chance | 114/245 |
| 3,541,989 | 11/1970 | Leonard | 114/332 |
| 3,611,975 | 10/1971 | Ashbrook | 114/245 |
| 3,673,556 | 6/1972 | Biggs | 114/245 |
| 3,953,826 | 4/1976 | Brundrit et al. | 367/106 |

Primary Examiner—Trygve M. Blix
Assistant Examiner—Jesús D. Sotelo
Attorney, Agent, or Firm—Millen & White

[57] ABSTRACT

A submerged device, carrying oceanography apparatuses, is adapted to be towed from a ship and provided with an automatic control of the submersion depth, which is made up of two hulls of positive buoyancy and interconnecting cross members with the device having a center of bouyancy substantially above the center of gravity, and at least one movable substantially airfoil shaped fin, which is actuated by the automatic control of the submersion depth which is sensitive to the depth of submersion of the device.

12 Claims, 11 Drawing Figures

SUBMERGED DEVICE, CARRYING OCEANOGRAPHY APPARATUSES, WITH AUTOMATIC DEPTH CONTROL

This is a continuation of application Ser. No. 925,243, filed July 17, 1978, and now abandoned.

This invention relates to a submerged device, also called "fish", comprising two hulls of positive buoyancy whose shape is specially designed to provide for a high hydrodynamic stability of the assembly. It is used for supporting one or more apparatuses for oceanography studies such for example as seismic wave transmission sources, receivers and seismic streamers, sonars, echo sounders and other measuring apparatuses, associated to a system for controlling a submersion movable paddle so as to adjust the submersion depth.

This fish may be used alone or as part of a series of fishes which may, for example, form a transmission device or a reception device of very great length.

The one or more fishes are associated to a cable system comprising traction cables, cables for power supply, cables for operating the control system and cables for controlling the transmission, reception or measuring devices, this cable assembly being connected to a ship towing the whole system.

The prior art in this field may be illustrated by the device described in the U.S. Pat. No. 3,704,681, relating to a submerged cable associated to a device for adjusting its submersion depth. This device comprises a floating member which entirely surrounds the cable and may rotate about the latter upon actuation of a control system comprising a piston controlled by an electric system and whose operation depends on the variations of the submersion depth. This device is particularly suitable for cables.

The device of this invention is adapted to support a wide variety of oceanography apparatuses while maintaining them perfectly stable. It cannot rotate about its longitudinal axis and is adapted to take an inclination towards the bottom or the surface. The control device associated therewith is very sensitive to the variations of the submersion depth and has a quick action for driving the fish back to the selective reference depth.

The invention will be well understood and its advantages made apparent from the following description, illustrated by the accompanying drawings, wherein:

FIG. 1 is a general view of the fish according to the invention carrying a seismic wave transmission source and its control system and provided with a two-cylinder control device.

FIG. 2 diagrammatically shows a control device comprising a cylinder fed with compressed air.

FIG. 3 diagrammatically shows a control device comprising a bellows fed with compressed air.

FIG. 4 diagrammatically shows a control device comprising a bellows in which vacuum has been made.

Figure 1:
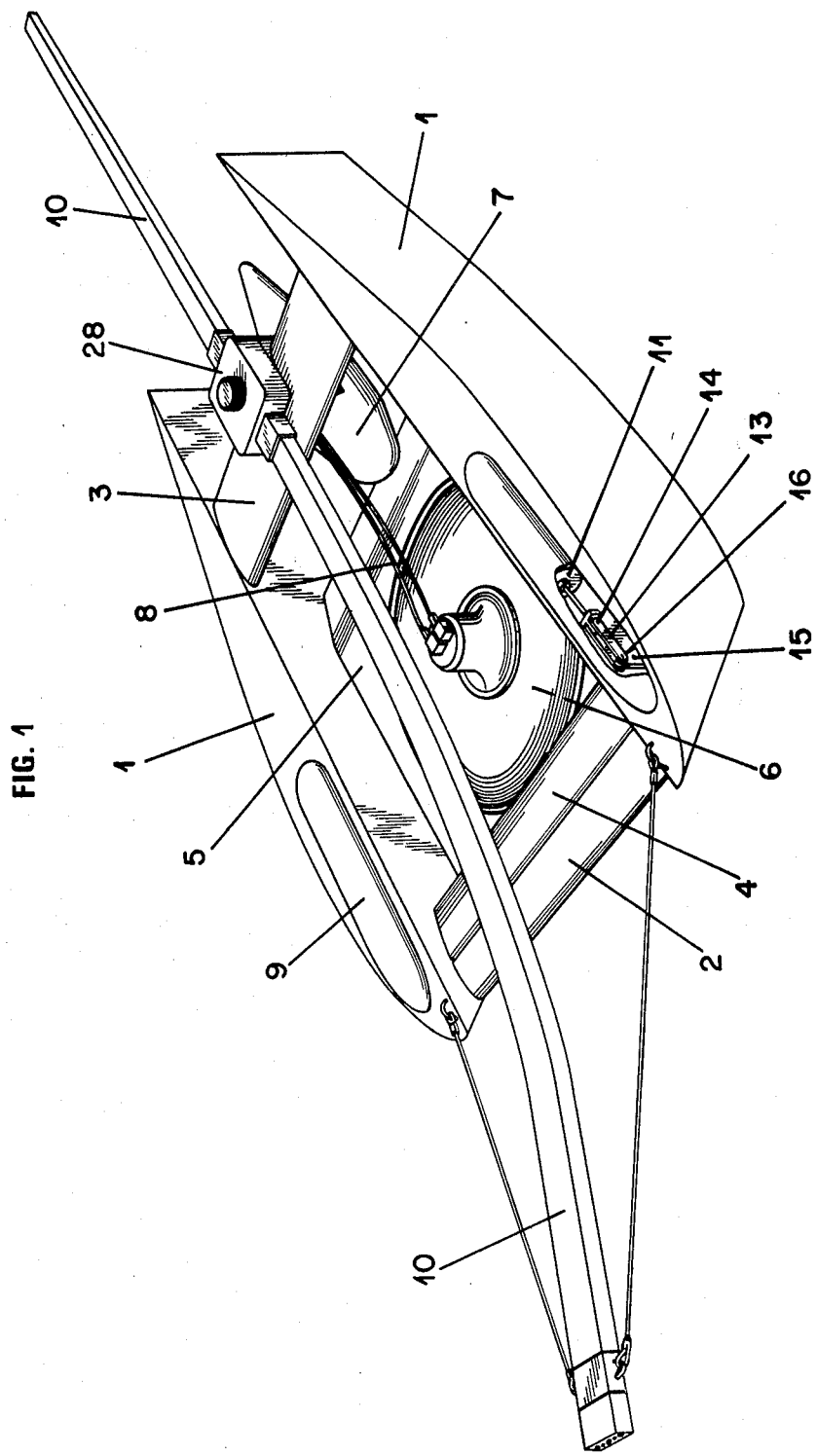

With reference to FIGS. 1 to 6, a fish according to the invention essentially comprises a careening including two hulls 1 of positive buoyancy. Each hull has a downwards and rearwards inclination of the head, as well as a very wide upper part and a very narrow lower part so as to form a balanced assembly whose careen center of displacement or center of buoyancy is substantially above the gravity center. Such an assembly is very stable in water and has only one equilibrium position.

The two hulls 1 are connected through airfoil shaped profiled cross-members 2 and 3 at least one of which, the head cross-member 2, is provided with a submersion movable fin 4 or front portion destined to control the submersion depth of the fish when the latter moves in water. Another central profiled cross-member 5, secured to both hulls, supports, in the selected embodiment, a source for seismic wave transmission 6, of the type described in the French patent specification No. 1,583,737, said source being called FLEXICHOC. This source, emitting by implosion, is hydraulically actuated from the ship. A control electrovalve system is placed in a tight enclosure 7 secured to the rear cross-member 3 of the fish. It is connected to the seismic source through flexible lines 8.

The movable fin 4 is associated to a two-part control device 9, adapted to maintain the fish at the selected depth. An embodiment of the control device will be described more in detail below.

The assembly of cables for the electric and hydraulic control of the operation of the different elements associated to the fish are assembled in a sheath 10 and connected to the ship on which is placed the electric control system, not shown.

Figure 2:
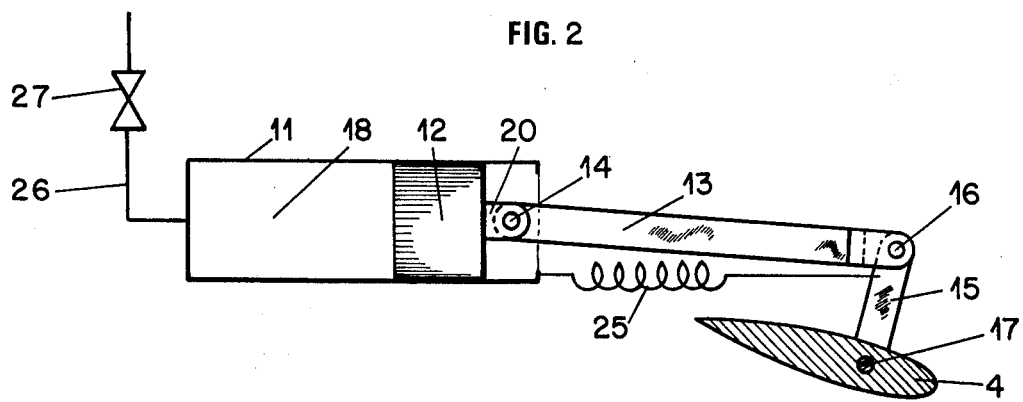

The control device 9 may consist, according to FIGS. 1 and 2, of a cylinder 11 wherein slides a piston 12, provided with a very short rod 20. An arm 13 is hinged at one end to rod 20 through an axle 14 and, at the other end, to a lever 15 integral with the movable fin 4, through an axle 16. The fin 4 is pivotable about its axis 17. A return spring 25 is secured, on the one hand, to cylinder 11 and, on the other hand, to the lever 15. The closed compartment 18 of cylinder 11 contains air compressed at a pressure in equilibrium with the hydrostatic pressure at the depth selected for the fish. At said depth the fin 4 is adjusted to a neutral position. A duct 26, provided with a valve 27, feeds compartment 18 with compressed air.

When the fish descends beyond said depth, the hydrostatic pressure increases, becoming higher than the air pressure in compartment 18. It pushes the piston 12 which penetrates into cylinder 11, driving therewith the rod 20, the arm 13 and the lever 15 which, while moving aside the piston, rotates the fin 4 about its axis 17.

The leading edge of fin 4, thus moves upwards and the fish rises again. When it rises above the desired depth, the hydrostatic pressure decreases, the piston moves towards the open end of cylinder 11, driving therewith the rod 20, the arm 13 and the lever 15. The latter, while moving on the opposite side of the piston, rotates the fin 4 whose leading edge is lowered thereby causing the fish to slope downwards. The spring 25 is intended to ensure the raising of the fish up to the surface in case of air leakage in compartment 18, by bringing back the leading edge of the fin to an upward direction.

Figure 3:
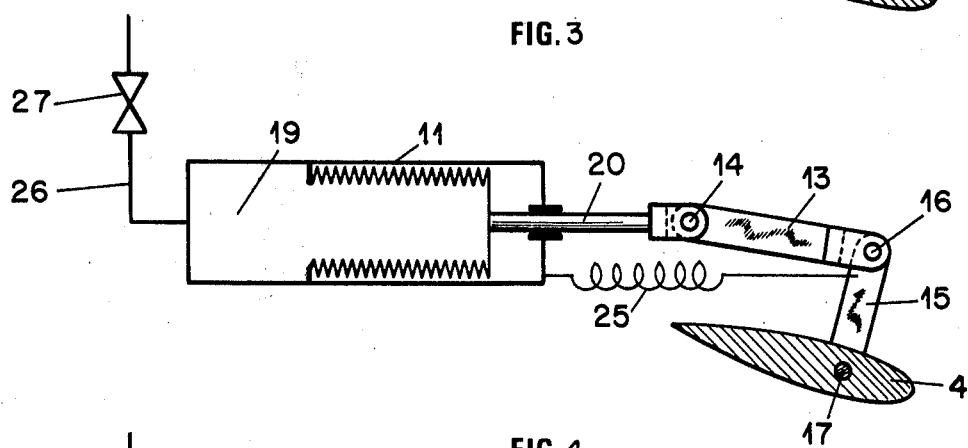

According to a first embodiment of the control device, illustrated by FIG. 3, a bellows 19 is filled with compressed air in equilibrium with the hydrostatic pressure at the depth selected for the fish. This bellows, placed into cylinder 11, to which it is secured at one end, may expand thereinto along its longitudinal axis. It is integral with a rod 20 on which is articulated, about an axle 14, an arm 13 the other end of which is articulated at 16 on the lever 15 solid with fin 4 which may pivot about its axis 17. A duct 26, provided with a valve 27, supplies the bellows 19 with compressed air.

The operation of this device is substantially identical to that of the device shown in FIG. 2, the bellows 19 collapsing when the hydrostatic pressure increases and expanding when the hydrostatic pressure decreases.

Figure 4:
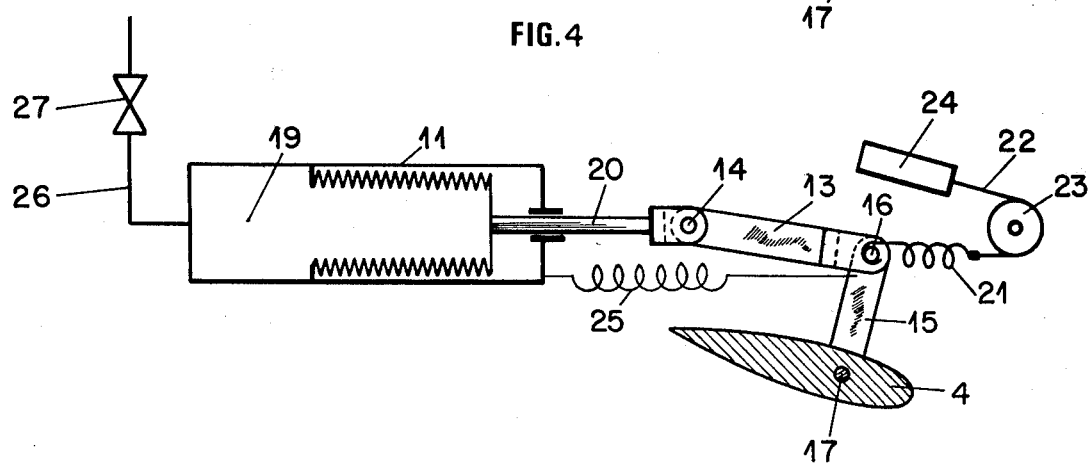

According to another embodiment of control device, illustrated by FIG. 4, this device comprises the same elements as those illustrated by FIG. 3 except that the bellows 19 has been subjected to vacuum instead of being filled with compressed air as in the previous case. The air is discharged through a duct 26 provided with a valve 27.

The device is further provided with a system comprising a spring 21 secured at one end to axle 16 and at the other end to a cable 22 which passes over a pulley 23 and is wound or unwound in member 24. In this embodiment, the hydrostatic pressure is obviously always greater than that prevailing in the bellows and the power is produced by the spring 21 whose tension balances the force exerted by the hydrostatic pressure on the bellows 19 when said pressure substantially corresponds to the depth selected for the fish. When the fish descends to a greater depth and the hydrostatic pressure increases, the bellows 19 collapses, thereby producing, through rod 20 and the arm 13, an increased tension of spring 21. The movement of the fin 4 is the same as in the preceding cases. When the fish raises and the hydrostatic pressure decreases, the bellows expands, the tension of spring 21 decreases, thereby resulting in a traction on arm 13, which produces the same movement of fin 4 as in the preceding cases.

These control systems are very sensitive to variations of the submersion depth and act rapidly to bring back the fish to the preselected reference depth.

Figure 5:
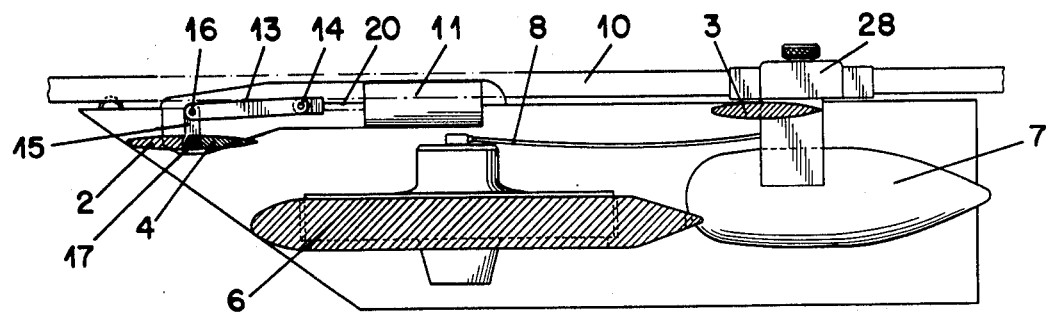
FIG. 5 is a cross-sectional view of the fish shown in FIG. 1.
Figure 6:
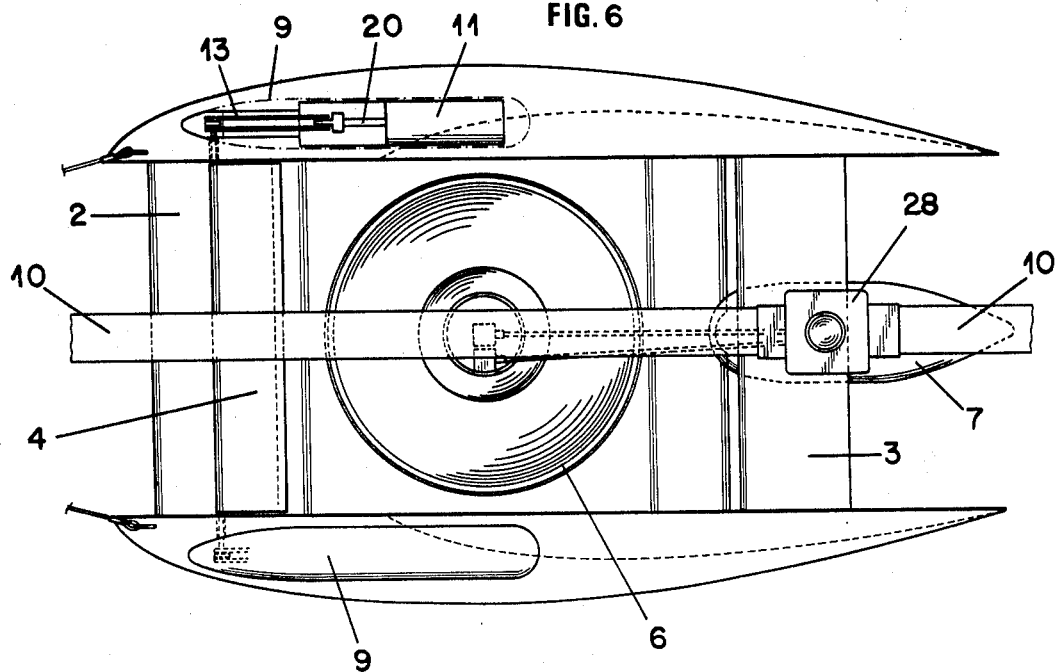
FIG. 6 is a view from above of the fish shown in FIG. 1.

FIGS. 5 and 6 respectively show a cross-sectional view and a view from above of the fish shown in FIG. 1, provided with its control system.

Figure 7:
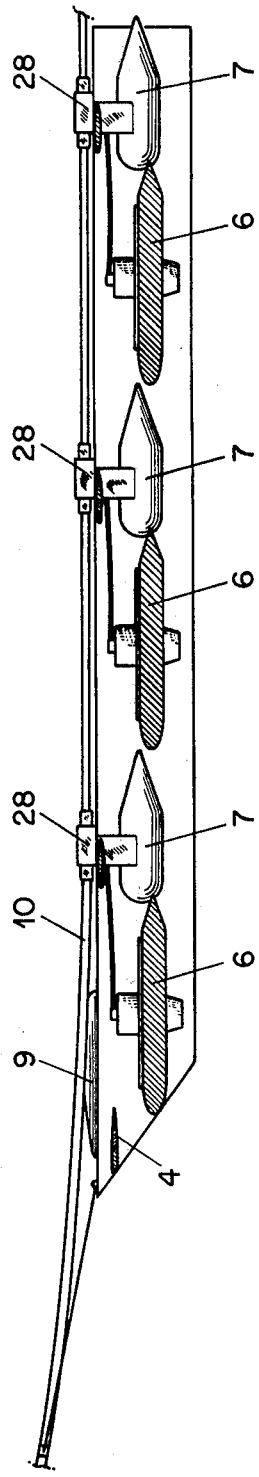
FIG. 7 shows a fish according to the invention comprising multiple seismic wave transmitting sources, each of which is provided with its control system.

FIG. 7 shows a fish comprising several sources 6 for transmitting seismic waves, each source being provided with its electrovalve system 7 whose feeding cables are all assembled into sheath 10 by means of connecting elements 28.

Figure 8:
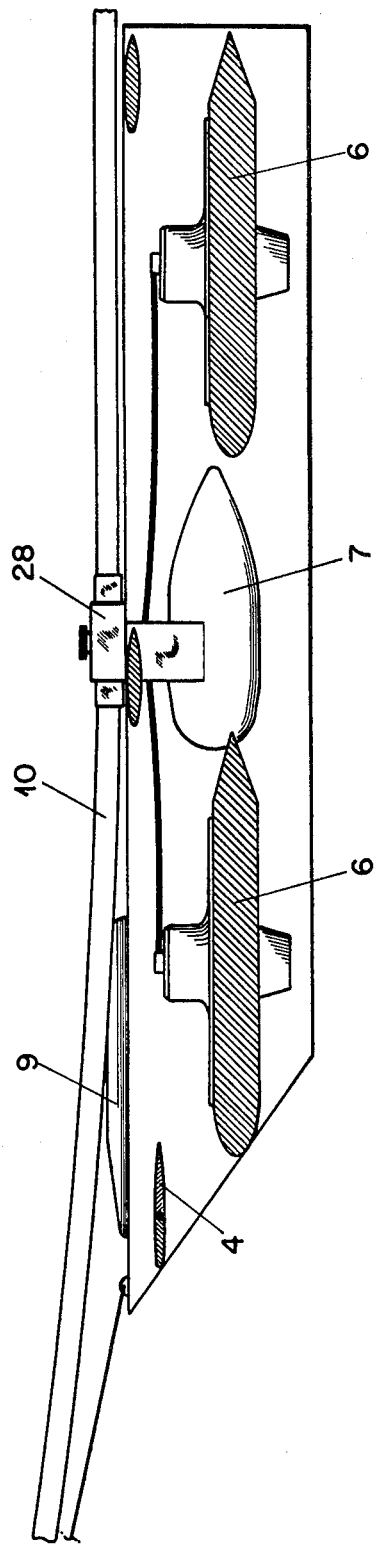
FIG. 8 shows a fish according to the invention, comprising two sources for seismic wave transmission, simultaneously controlled by a single control system.

FIG. 8 shows a fish according to the invention, comprising two seismic wave transmitting sources 6, simultaneously actuated through a single electrovalve system 7 whose feeding cables are assembled in sheath 10 by connecting elements 28.

Figure 9:
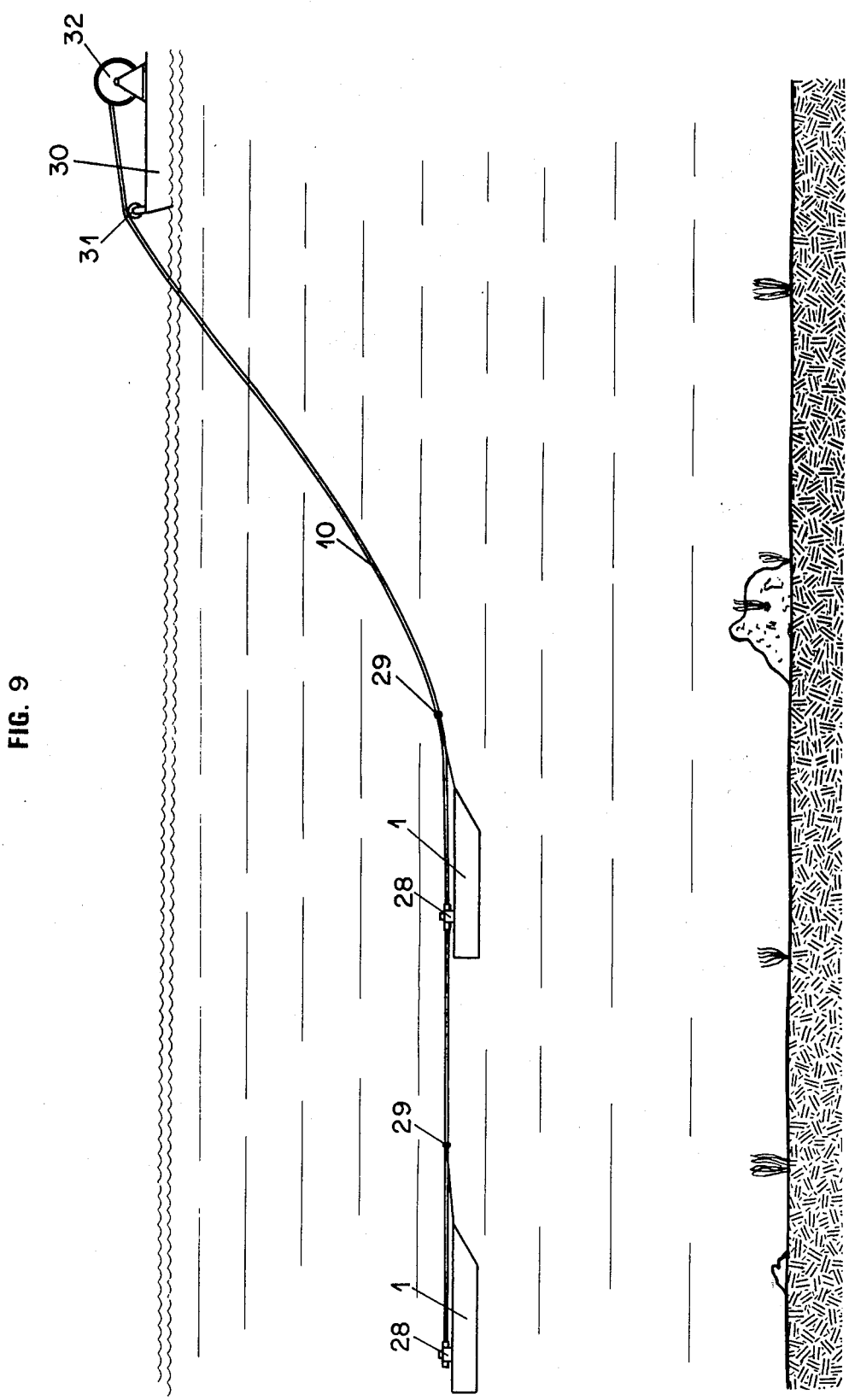
FIG. 9 shows a multiple fish system towed, through a single cable assembly, behind a ship.
Figure 10:
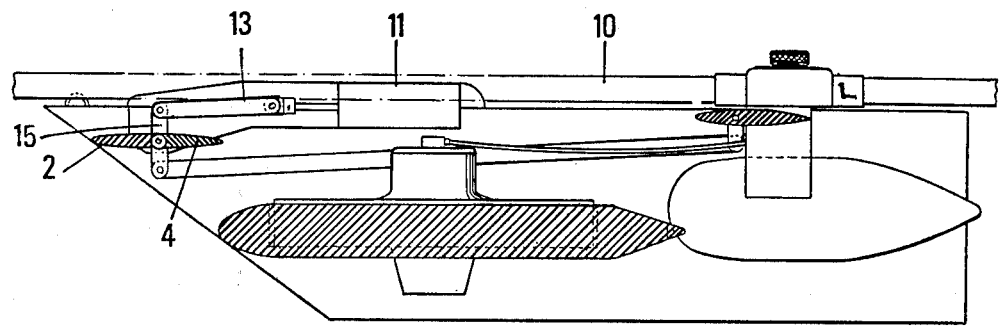
FIG. 10 is a cross-sectional view of an alternative embodiment of the fish of this invention, having front and rear movable fins.
Figure 11:
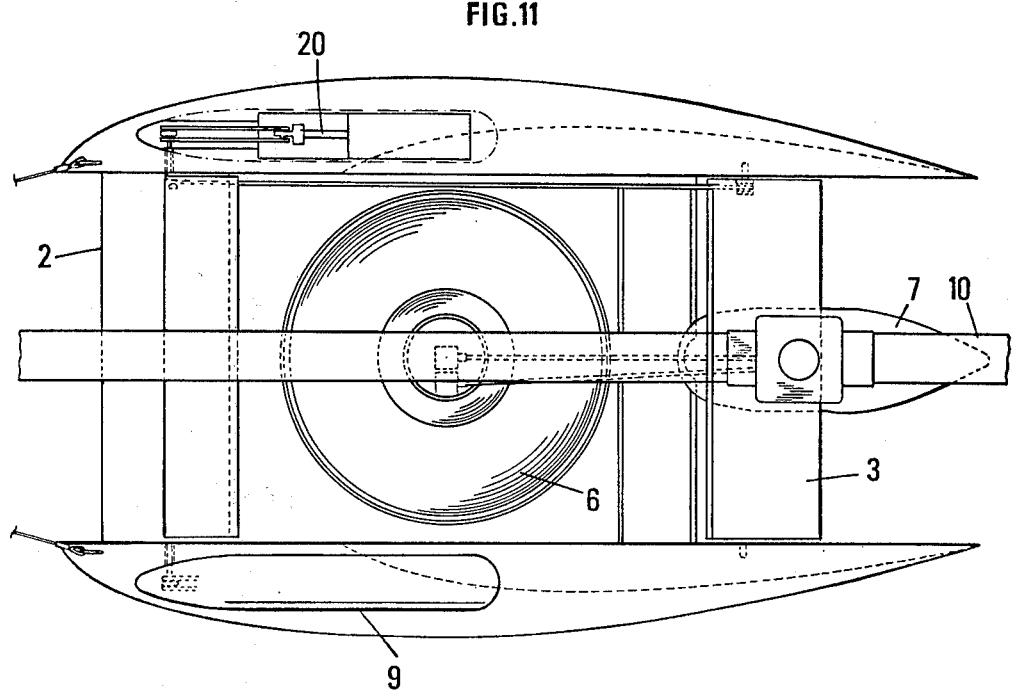
FIG. 11 is a top view of the fish of FIG. 10.

FIG. 9 illustrate a multiple fish device towed behind a ship 30. The hulls 1 of the successive fishes are connected to the cable assembly 10, through anchoring systems 29. The different control and power supplying cables of the supported apparatuses are connected to the cable assembly 10 through connecting elements 28.

When the operations relating to oceanography studies are completed, the submerged assembly is brought back on the ship 30 by winding the cable assembly 10 on a reel 32 placed on the ship. An intermediate pulley 31 is placed at the stern of the ship.

In the different selected examples carrying devices for seismic sources have been described. It is obvious that these carrying devices may be used in a similar way for supporting other apparatuses for oceanography studies and for example for towing streamers.

Similarly, in the selected examples, the submerged devices comprise a single movable immersion fin placed at the head. It is obvious that several movable fins may also be used.

It may also be of interest to couple one movable fin adapted to the back cross-member of the fish, with the movable fin at the head. In said case, the same control system actuates the two fins in the same manner.

It may be observed that, in the selected examples, the assembly of the different apparatuses is placed in a space confined between the two hulls of the device. It does not exhibit any externally protruding part liable to cause a grazing of the device.

What I claim is:

1. A support device for carrying at least one oceanography apparatus, said support device adapted for being towed from a ship at an automatically controlled submerged depth and having connecting means for being connected to the ship, said support device comprising:

at least one assembly of two spaced apart closed hulls, said hulls extending longitudinally parallel and connected to each other, said hulls having a greater volume top portion for providing said support device with a center of bouyancy substantially above its center of gravity and having its greatest width at the top portion thereof and tapering downwardly and rearwardly to have a smaller volume and lesser width, relative to said top portion, at the lower and rearward portion thereof, said top portion being substantially flat at the top surface thereof;

a first connecting element located between said two spaced apart hulls at the front thereof connecting said two spaced apart hulls together, said first connecting element having a substantially airfoil shape and comprising a first front portion and a second rear part with the first portion being fixed and the second portion being pivotally connected for pivotal movement about its connecting axis for varying the submerged depth of said support device;

control device means mounted in each of said two hulls and connected to said first connecting element rear portion for automatically controlling the pivotal movement of said first connecting element rear portion, and wherein said control device means comprises at least one cylinder having at least one bellows located therein and secured to said cylinder at one end of said bellows, said bellows being maintained at a pressure below atmospheric by a vacuum source and having a rod-lever assembly connected thereto, said rod-lever assembly comprising a rigid rod connected to said bellows for translational movement, an arm pivotally connected to the rod of said rod-lever assembly at the end thereof away from said bellows and a lever pivotally connected at one end to the end of said arm away from said rod, and at the other end, to said pivotable first connecting element rear portion, and spring means connected at one end to the connecting point of said lever and arm, and at the other end to a part of the support device, with said spring means being for counteracting the pressure exerted on said bellows as a result of a variance in the depth of submersion of said support device; and at least one secondary connecting element located between said two spaced apart hulls substantially between the front and rear portion of said hulls for connecting said two hulls together and for supporting at least one oceanography apparatus thereon, said at least one secondary connecting element having a substantially airfoil shape for stabilizing said support device and reducing drag thereon when being towed.

2. A support device as in claim 1 further comprising a return spring connected at one end to said cylinder and at the other end to said lever, said return spring exerting a force on said lever for turning said pivotable first connecting element rear portion upward for turning said support device in the direction of the surface when the pressure in said bellows rises above atmospheric.

3. A support device for carrying at least one oceanography apparatus, said support device adapted for being towed from a ship at an automatically controlled submerged depth and having connecting means for being connected to the ship, said support device comprising:

at least one assembly of two spaced apart closed hulls, said hulls extending longitudinally parallel and connected to each other, said hulls having a greater volume top portion for providing said support device with a center of buoyancy substantially above its center of gravity and having its greatest width at the top portion thereof and tapering downwardly and rearwardly to have a smaller volume and lesser width, relative to said top portion, at the lower and rearward portion thereof, said top portion being substantially flat at the top surface thereof;

a first connecting element located between said two spaced apart hulls at the front thereof connecting said two spaced apart hulls together, said first connecting element having a substantially airfoil shape and comprising a first front portion and a second rear portion with the first portion being fixed and the second portion being pivotally connected for pivotal movement about its connecting axis for varying the submerged depth of said support device;

control device means mounted in each of said two hulls and connected to said first connecting element for automatically controlling the pivotal movement of said second rear portion of said first connecting element;

at least one secondary connecting element having a substantially airfoil shape for stabilizing said support device and reducing drag thereon when being towed; and said connecting means located toward the rear of said support device relative to said at least one secondary connecting element for being connected to a single line, said single line being a single unit containing control lines therein for simultaneously controlling said at least one oceanographic apparatus and towing said support device.

4. A support device as in claim 3 wherein said at least one assembly of two spaced apart hulls comprises more than one assembly having oceanography apparatuses supported thereon and a single control system for controlling said oceanography apparatuses, said single control system positioned at said connecting means and said connecting means having anchor means for securing said single line thereto, said single line having a plurality of control cables, each corresponding to the individual assemblies of said more than one assembly and connected to said single control system of said assemblies for controlling said oceanography apparatuses.

5. A support device as in claim 3 wherein said at least one oceanography apparatus comprises a plurality of apparatuses, each having a secondary connecting element, and each apparatus comprising respective source means for transmitting seismic waves, and said support device further comprising a single control system connected to said plurality of oceanography apparatuses for control thereof.

6. A support device as in claim 3 wherein said control device means comprises at least one cylinder having at least one bellows located therein and secured to said cylinder at one end of said bellows, said bellows being fed by a compressed air source for maintaining compressed air therein at a specified pressure for maintaining said support device at a desired depth, said bellows having a rod-lever assembly connected thereto at its other end which is connected to said pivotable first connecting element rear portion.

7. A support device as in claim 6 further comprising a return spring connected at one end to the free end of said cylinder and at the other end to said rod-lever assembly, said return spring exerting a force on the lever of said rod-lever assembly for turning said pivotable first connecting element rear portion upward for turning said support device in the direction of the surface when compressed air is released from said bellows.

8. A support device as in claim 7 wherein said rod-lever assembly comprises a rigid rod connected to said bellows for translational movement, an arm pivotally connected at one end to the end of said rod away from bellows and having said lever pivotally connected at the other end thereof, said lever pivotally connected, at the end away from said arm, to said pivotable first connecting element rear portion for causing movement thereof.

9. A support device as in claim 3 wherein said control device means comprises at least one cylinder having at least one bellows located therein and secured to said cylinder at one end of said bellows, said bellows being maintained at a pressure below atmospheric by a vacuum source and having a rod-lever assembly connected thereto, said rod-lever assembly comprising a rigid rod connected to said bellows for translational movement, an arm pivotally connected to said rod at the end thereof away from said bellows and a lever pivotally connected at one end to the end of said arm away from said rod, and at the other end, to said pivotable first connecting element rear portion, and spring means connected at one end to the connecting point of said lever and arm, and at the other end to a part of the support device, with said spring means being for counteracting the pressure exerted on said bellows as a result of a variance in the depth of submersion of said support device.

10. A support device as in claim 9 further comprising a return spring connected at one end to said cylinder and at the other end to said lever, said return spring exerting a force on said lever for turning said pivotable first connecting element rear portion upward for turning said support device in the direction of the surface when the pressure in said bellows rises above atmospheric.

11. A support device as in claim 3 further comprising at least a third connecting element located between said two spaced apart hulls at the rear thereof connecting said two spaced apart hulls together, said at least a third connecting element having a substantially airfoil shape and comprising a first front part and a second rear part with the first part being fixed and the second part pivotally connected for pivotal movement relative to the rear of said two hulls for varying the submerged depth of said support device, said at least a third connecting element second rear part having a connecting assembly simultaneously connected thereto and to said first connecting element second rear portion for being simultaneously controlled therewith.

12. A support device as in claim 3 wherein said at least one assembly of two spaced apart hulls comprises a plurality of assemblies, each assembly having a single control system connected to said at least one oceanography apparatus for control thereof.

* * * * *